June 3, 1952 — G. L. WESTBY — 2,599,030
AUTOMATIC ANIMAL FEEDER
Filed Nov. 28, 1947 — 2 SHEETS—SHEET 1
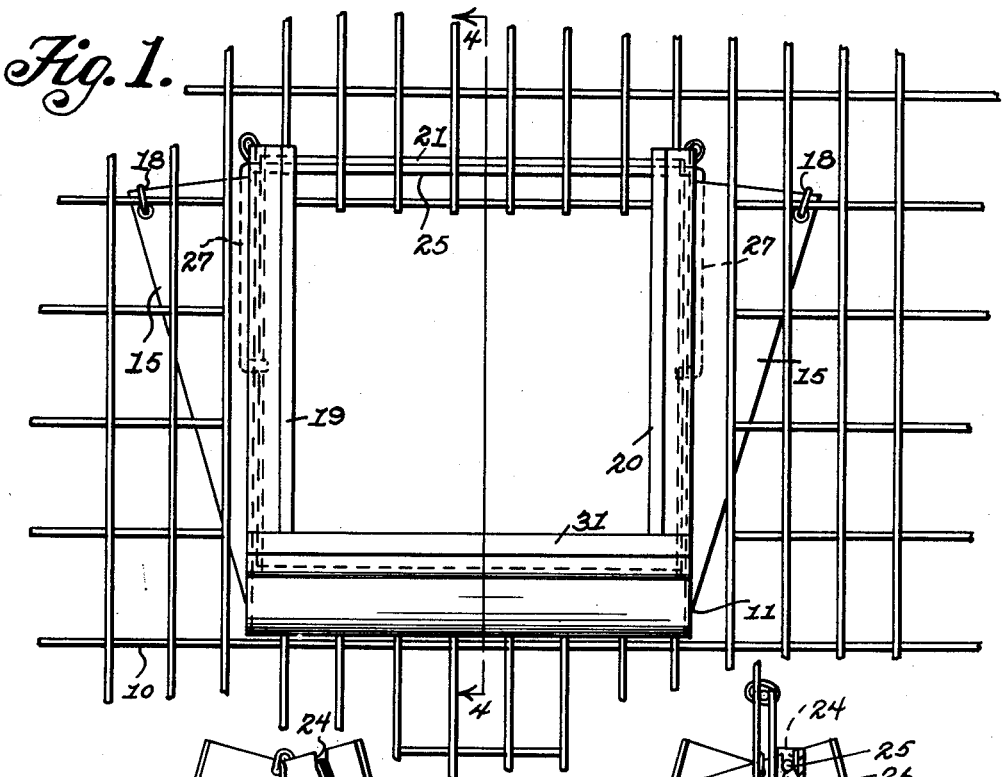
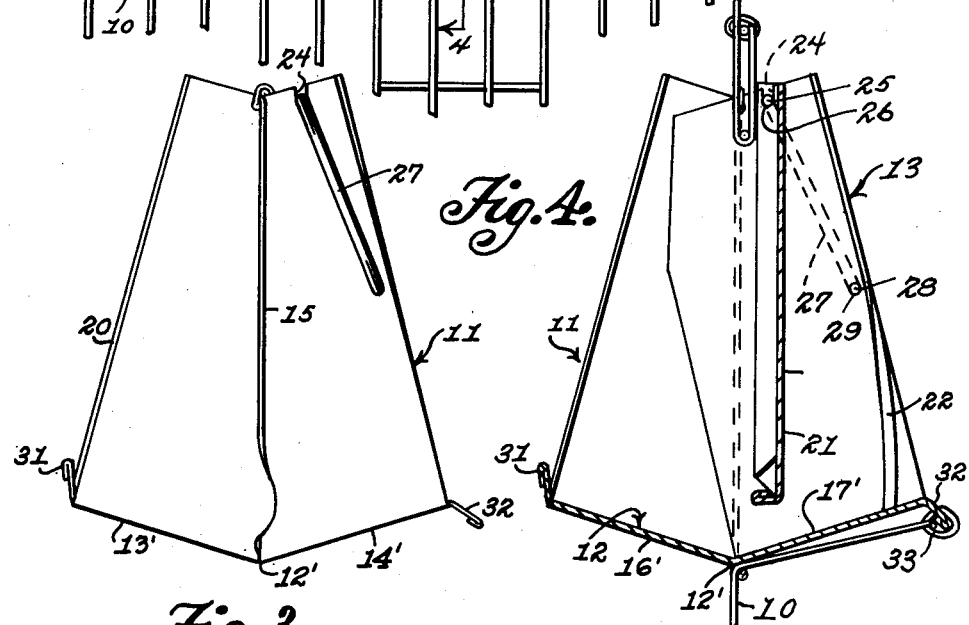
INVENTOR.
Gordon L. Westby
ATTORNEYS June 3, 1952 G. L. WESTBY 2,599,030
AUTOMATIC ANIMAL FEEDER
Filed Nov. 28, 1947 2 SHEETS—SHEET 2
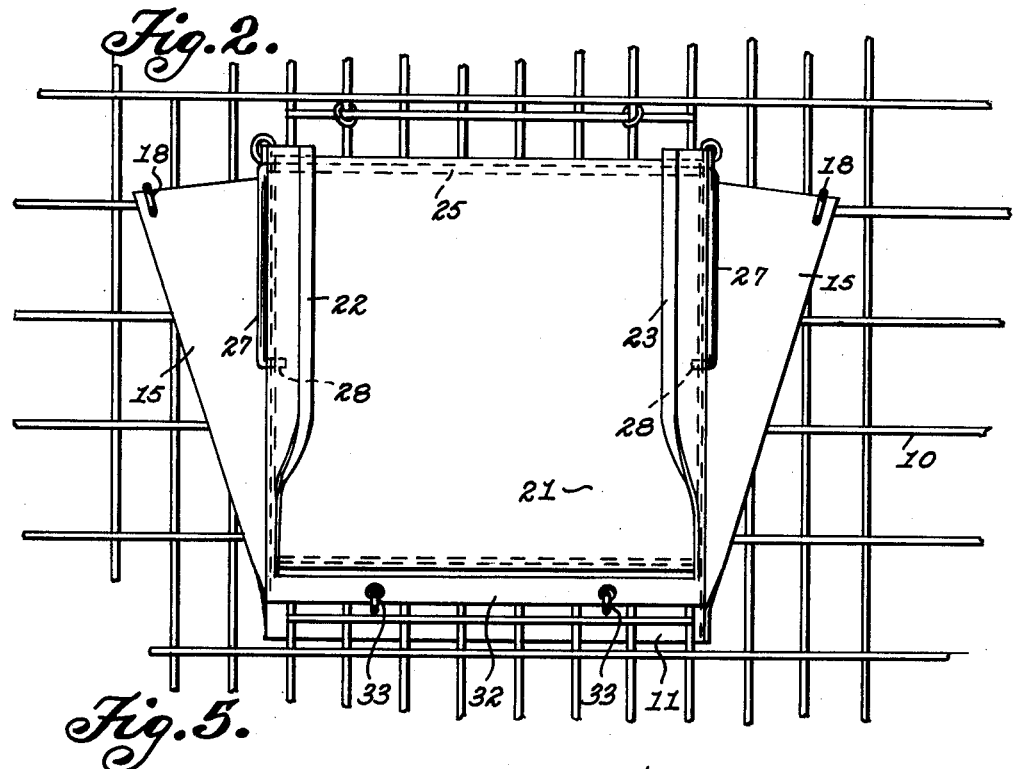
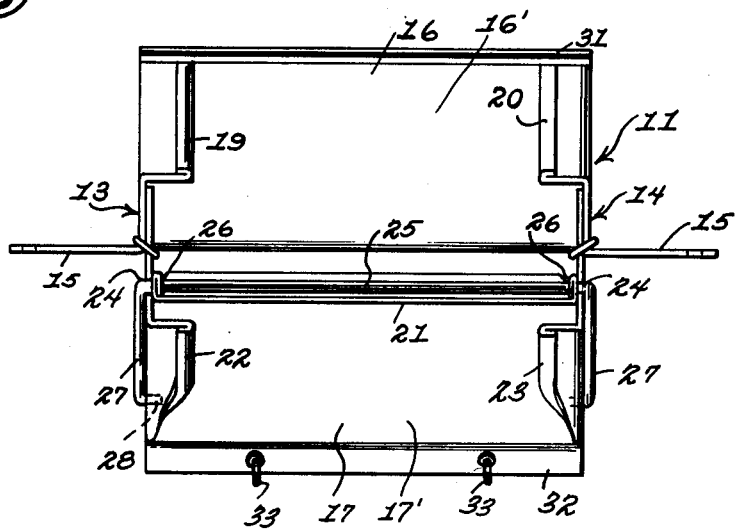
INVENTOR.
Gordon L. Westby
BY Victor J. Evans & Co.
ATTORNEYS Patented June 3, 1952

2,599,030

UNITED STATES PATENT OFFICE 2,599,030

AUTOMATIC ANIMAL FEEDER

Gordon L. Westby, Deerfield, Wis.

Application November 28, 1947, Serial No. 788,616

1 Claim. (Cl. 119—18)

This invention relates to an automatic animal feeder.

It is an object of the present invention to provide an animal feeder device which can be placed in the cut wire of the pen on which can be rested food for the animal and a door is swingable to a position at the outer end of the feeder to permit the animal to gain access to all the feed rested upon the feeder bottom clear out to the outer end of the same and wherein the swinging panel or door can be released from the feeder by a simple spreading of wire ends of the pivot shaft which supports the panel.

Other objects of the present invention are to provide an automatic animal feeder which is of simple construction, inexpensive to manufacture, easy to install on the wire cage and efficient in operation.

For other objects and for a better understanding of the invention, reference may be had to the following detailed description taken in connection with the accompanying drawing, in which Fig. 1 is a rear elevational view of the feeder mounted in the cage wire.

Fig. 2 is a front elevational view of the feeder.

Fig. 3 is a side elevational view of the feeder removed from the cage.

Fig. 4 is a sectional view, in elevation, taken on line 4—4 of Fig. 1.

Fig. 5 is a top plan view of the feeder removed from the cage.

Referring now to the figures, 10 represents a wire screen forming a part of the cage into which a hole is cut to extend feeder 11 embodying the features of the present invention. This feeder 11 is formed of sheet metal parts which are fixed together to provide a tray or bottom portion 12, end portions 13 and 14, with wing portions 15 thereon. The bottom portion 12 and the end portions 13 and 14 are preferably made of two different sheet metal parts which are folded at the middle or central line 12' into U-shape. On each part is a bottom portion and two upwardly extending end portions which extend upwardly from the end edges 13' and 14' respectively of the bottom portions 16' and 17' respectively. The base parts are brought into edge to edge relationship and are tilted upwardly and inwardly so that the sides overlap one another. These parts can be secured together by soldering or welding or in any other suitable manner. The parts so connected together will form the bottom portion 12 and the end portions 13 and 14.

These parts may be indicated at 16 and 17. The part 16 has the fins or wings 15 adapted to engage the front face of the cage wire as shown in Fig. 2 and will be secured to the same by rings 18. The inner sides of the part 16 are turned inwardly as indicated at 19 and 20 to serve as stops for limiting the inward movement of swinging panel 21. The part 17 has its sides overlapping with the sides of the part 16 and inwardly thereof as viewed in Fig. 5 and further has its sides bent inwardly as indicated at 22 and 23 to provide a sturdy stop for limiting the outward swinging movement of the panel 21.

In the upper ends of the sides of the part 17 are notches 24 adapted to receive a pivot shaft 25 which is extended through flanges 26 of the panel 21. This pivot shaft supports the panel on the sides of the part 17. The panel can pivot on the shaft 25.

The ends of the shaft 25 are bent down as indicated at 27 and are turned inwardly as indicated at 28 so as to enter a hole 29 in the sides of the parts so as to permit the outward removal of the shaft from the notches 24. The panel can swing inwardly and outwardly and will accordingly be retained in place by the downwardly bent ends 27 of the shaft. If it is desired to gain access to the cage, the shaft ends 27 can be sprung outwardly and the shaft and the panel removed.

The bottom portions 16' and 17' respectively of the parts 16 and 17 can be formed from one integral piece and the bottom portion 12 formed by bending the portions 16' and 17' upwardly at the middle or central line 12'. The bottom portion 12 may have a flange 31 at the rear edge and a dropped flange 32 at the front edge. A part of the wire cage 10 can be extended forwardly for connection with the dropped flange 32 as indicated at 33 whereby the outward movement of the feeder will be prevented.

The feed is placed on the bottom portion 12 from the outside of the pen. The panel 21 will be forced inwardly by the weight of the feed and when the feed settles, the part 21 will move outwardly over the feed. The animal can force the panel 21 outwardly with its nose until all of the food has been consumed. The stop portions 22 and 23 will limit the outward movement of the panel.

When cleaning the feeder, the panel will be moved inwardly and scraping action can be effected upon the bottom and the uneaten parts of the food can be collected in a vessel which, at the time, will be placed under the downwardly bent flange 32.

While various changes may be made in the detail construction, it shall be understood that such changes shall be within the spirit and scope of the present invention as defined by the appended claim.

I claim:

In an animal feeder for attachment to a wire cage, a bottom portion divided at the middle line thereof with the portions of the bottom portion on opposite sides of the middle line extending upwardly from the middle line, first and second parallel overlapping end portions projecting upwardly from each of the end edges of said upwardly extending portions, a panel positioned between said end portions and mounted for swinging movement about a horizontal pivot shaft, stop means on said end portions for limiting swinging movement of said panel, a fin extending from the outer edge of the first end portions for attaching said feeder to said wire cage, said pivot shaft pivotally connecting said panel to the second of said end portions, and a flange projecting from the upwardly extending portion of the bottom portion connected to the second of said end portions and adapted to be connected to a portion of said wire cage for maintaining said feeder immobile.

GORDON L. WESTBY.

REFERENCES CITED

The following references are of record in the file of this patent:

UNITED STATES PATENTS

| Number | Name | Date |
|---|---|---|
| 1,083,029 | Philo | Dec. 30, 1913 |
| 1,111,016 | Fohman | Sept. 22, 1914 |
| 1,472,707 | Weisz | Oct. 30, 1923 |
| 1,875,858 | Mikkelsen | May 10, 1932 |

FOREIGN PATENTS

| Number | Country | Date |
|---|---|---|
| 58,597 | Norway | Nov. 1, 1937 |